United States Patent

[11] 3,631,749

[72] Inventor Raymond Poupin
Fleury-les-Aubrais, France
[21] Appl. No. 880,469
[22] Filed Dec. 8, 1969
[45] Patented Jan. 4, 1972
[73] Assignee Service d'Exploitation Industrielle des Tabacs et des Allumettes
Paris, France
[32] Priority June 27, 1966
[33] France
[31] 66 976
Continuation of application Ser. No. 648,304, June 23, 1967. This application Dec. 8, 1969, Ser. No. 880,469

[54] DEVICE FOR MODIFYING THE PATH OF A CONTINUOUS ROD AS MANUFACTURED BY A MACHINE SUCH AS A CIGARETTE-MAKING MACHINE
13 Claims, 5 Drawing Figs.

[52] U.S. Cl...................................... 83/106,
83/60, 83/150, 83/593, 131/65, 146/101,
146/DIG. 1
[51] Int. Cl............................................ B26d 7/06
[50] Field of Search........................................ 83/60, 80,
106, 163, 371, 372, 105, 593, 150; 131/63, 64, 65,
60; 146/101, DIG. 1

[56] References Cited
UNITED STATES PATENTS
| | | | |
|---|---|---|---|
| 2,444,306 | 6/1948 | Molins.................... | 131/60 |
| 3,244,050 | 4/1966 | Pym......................... | 131/60 X |
| 3,526,232 | 9/1970 | Dearsley................. | 146/101 X |

Primary Examiner—Andrew R. Juhasz
Assistant Examiner—James F. Coan

ABSTRACT: In a device for modifying the path of a continuous rod which is manufactured by a machine such as a cigarette-making machine comprising means for diverting said rod and cutting means, the provision of cutting means adapted to cut the rod, the latter being either in the diverted or nondiverted position, for instance a rotary drum which carries on its periphery a plurality of blades having opposite cutting edges.

DEVICE FOR MODIFYING THE PATH OF A CONTINUOUS ROD AS MANUFACTURED BY A MACHINE SUCH AS A CIGARETTE-MAKING MACHINE

This application is a continuation of the copending application Ser. No. 648,304 filed on June 23, 1967.

The present invention relates to a device for modifying the path of a continuous rod which is manufactured by a machine such as a cigarette-making machine.

When the production of a machine of this type stops under normal conditions, the front or upstream end of the rod remains engaged in the ducts of the different sections which precede the cutting units and cigarettes come to a standstill within the guides which are located downstream of said units.

Under these conditions, if it is endeavored to put the forming machine back into service, that portion of the rod which is not sealed with paste as a result of drying of the pasting disc during stoppage accordingly opens and stops inside the ducts referred to above, thus giving rise to a fault condition known as "rod obstruction" or clogging which results in a further stoppage of production. At this moment, the section of rod and the cigarettes which are at a standstill in the different guides located either upstream or downstream of the cutting unit constitute "plugs" and the removal of such plugs usually proves a difficult operation.

It is apparent from the foregoing that restarting of a forming machine is facilitated if the zone of tobacco rod which comprises the nonpasted portion is removed at the time of startup.

The device according to the invention therefore makes it possible on the one hand to break the cigarette rod upstream of the cutting unit and then to deflect the newly formed rod towards a wastebox, this operation being carried out automatically at the time of stoppage of the forming machine and while this latter is in process of slowing down and, on the other hand, starting from the previous position, to break the cigarette rod downstream of the drying iron in order that the newly formed rod can penetrate into the cutting unit, this operation being performed automatically during startup of the machine and, lastly by way of addition, to permit the sampling of desired lengths of rod during normal operation of the machine.

It has already been proposed, in particular in machines for manufacturing filter rods, to provide devices comprising means for deflecting or diverting the rod of tobacco and cutting means. But in these known devices, the cutting means are so designed that they cannot cut the rod in the normal position, namely in the nondiverted position. Consequently, such devices can only come into action at the time of startup of the machine which is making said rod.

The device in accordance with this invention which makes it possible to produce action both at the time of startup and during operation is characterized in that the cutting means are adapted to cut the rod, the latter being either in the diverted or nondiverted position.

The cutting means can comprise two separate elements which are mounted so as to produce action respectively on the nondiverted rod and on the diverted rod and, in a particular form of construction, said means are constituted by two separate portions of the diverting member or deflector itself, for example by the two opposite edges of a rotatably mounted member.

In order to reduce the time of response of the cutting and diverting members, it is an advantage to mount a plurality of said members on a same shaft, in which case said members can constitute a rotary drum which is adapted to carry at its periphery a plurality of blades with opposite cutting edges.

The invention additionally consists in communicating the rapid movement which is necessary for the breaking-off and deflecting operations by means of a flexible articulation which permits of angular torsional deformation, thereby causing the drum to rotate by one step after the flexible elastic articulation has been subjected to sufficient torsion between two rings which are locked in alternate sequence by means of a bolt.

Further characteristics of the invention will become apparent from the description which now follows, reference being made to the accompanying drawings which show one example of execution, and in which.

Figure 1:
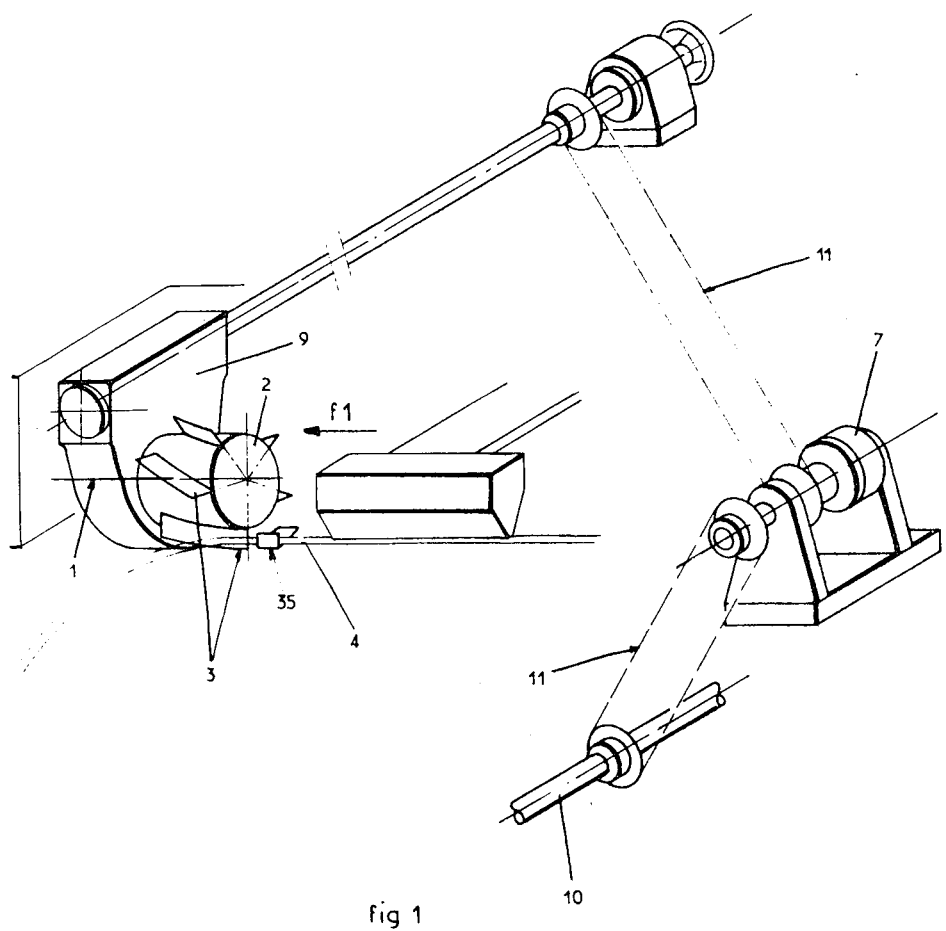
FIG. 1 is a view in isometric perspective showing the device as a whole.
Figure 2:
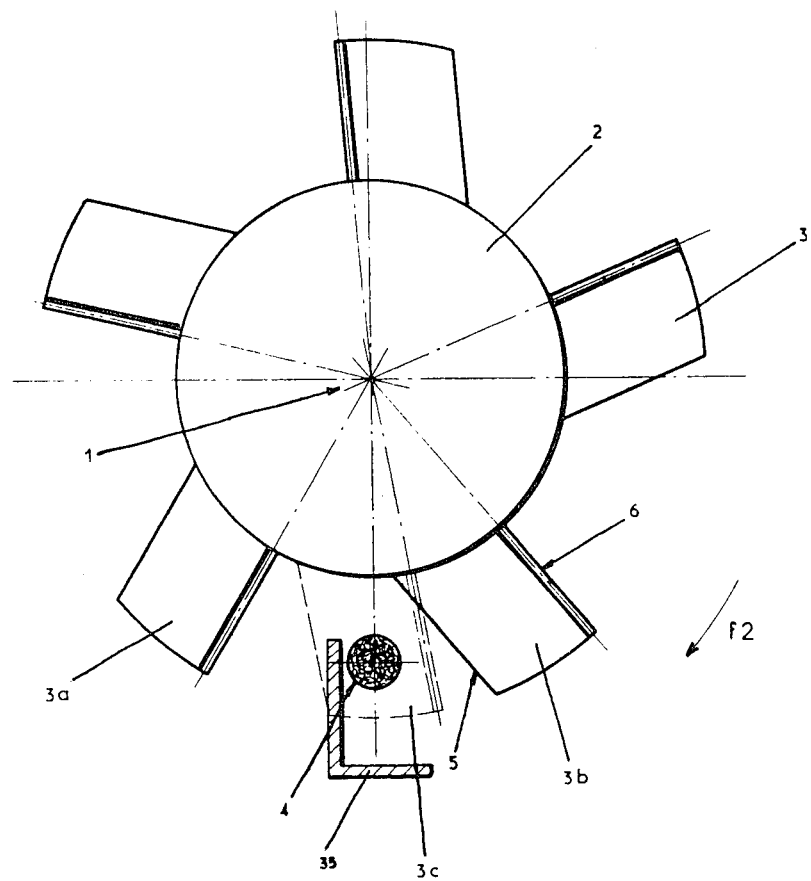
FIG. 2 is an end view of the rotary blade-drum looking in the direction of the arrow $f_1$ of FIG. 1.
Figure 3:
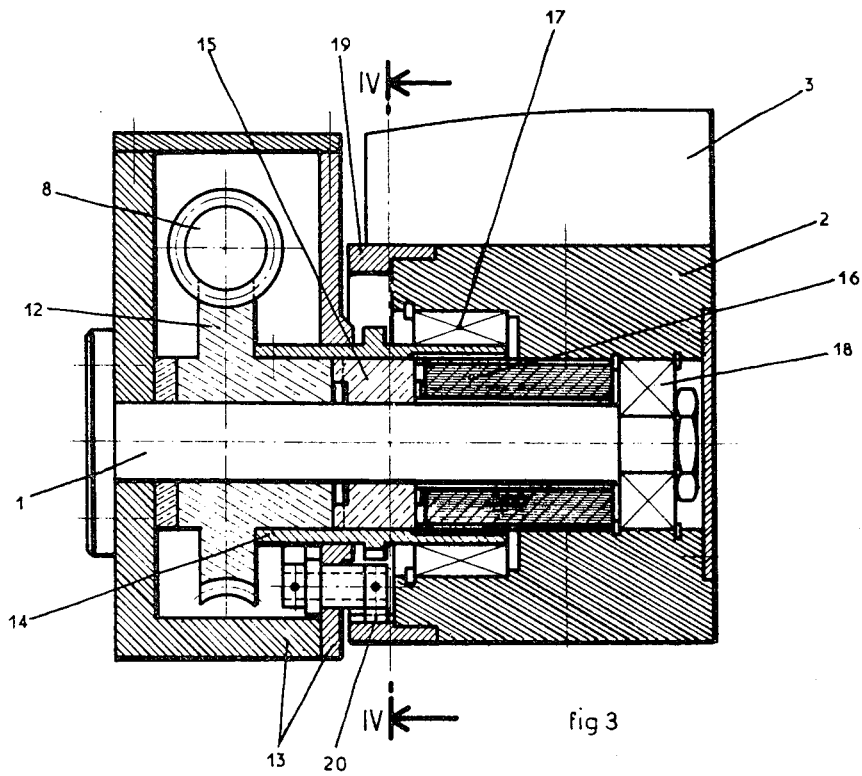
FIG. 3 is a longitudinal sectional view of the drum of FIG. 2.

The drum 2 which is adapted to move about the axis 1 is provided at its periphery with five suitably curved blades 3 so disposed as to intersect the path of the cigarette rod 4.

During one revolution of the drum in the direction of the arrow $f_2$, each blade takes up successively 10 stable positions which are geometrically defined. Transition of the blade from one position to the next takes place at very high speed.

When a blade 3 takes up position $3a$, the following blade is located at $3b$; the rod 4 can then penetrate freely into the different guides by which it is conveyed to the cutting unit since there is nothing to modify its path. The blades are located in this position when the machine is producing cigarettes in the normal manner.

When a blade moves rapidly from position $3b$ to position $3c$, the leading edge 5 of said blade which is chamfered and carries out a shearing action accordingly strikes the rod 4 and breaks this latter. The blade then shuts off the entrance to the cutting unit and deflects any newly formed rod towards a wastebox. The blades take up this new position during the transient phase of slowing down of the forming machine and remain in that position until the machine is started up again.

Should the blade then leave position $3c$ to come into position $3a$, the deflected rod is thus abruptly displaced from its path and broken at the level of the trailing edge 6 against the stationary plate 35, the plane of which is substantially parallel to the edge 6 at the moment at which the blade crosses the path of the rod 4; the front or upstream end of the rod which is newly formed then engages within the guide members of the cutting unit and the machine is then producing cigarettes once again.

The electromagnetic clutch 7 (as shown in FIG. 1) makes it possible in the excited state to drive the worm 8 of the reduction-gear unit 9 from a shaft 10 of the general controls of the forming machine. Chain drive systems 11 provide intermediate connections.

The gearwheel 12 of the reduction-gear unit 9 is adapted to rotate freely on the shaft 1 which is secured to the casing 13. Said gearwheel is rigidly fixed to the splined ring 14 and the coupling sleeve 15 which drives the inner cage of the flexible block 16. The outer cage of the flexible block 16 drives the drum 2 which carries the blades 3.

The drum 2, which is rotatably mounted on two roller-bearings 17 and 18, is adapted to carry a ring 19 in which are formed internal grooves. The locking-bolt 20 whose pin 21 is pivotally mounted in the casing 13 is capable of penetrating into the grooves of the rings 14 or 19. The lever 22 which is actuated by the locking-bolt 20 is adapted to control the microswitch 24 by means of the push-rod 23.

Figure 4:
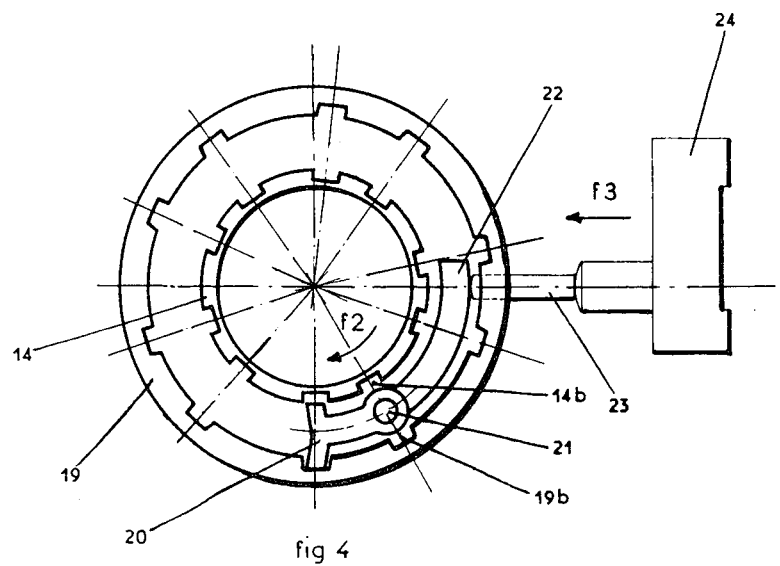
FIG. 4 is a transverse sectional view taken along the line IV—IV of FIG. 3.

When the cigarette-making machine is in a stable state, whether said machine is at a standstill or producing cigarettes at the normal rate, the drum 2 occupies one of the 10 positions which were defined earlier. Under these conditions, the torsion of the block 16 is zero and the members 14, 19 and 20 re disposed as shown in FIG. 4. Thus, the grooves of rings 14 and 19 correspond and the spring of the microswitch 24 produces action on the push-rod 23 in the direction $f_3$ so as to maintain the locking-bolt 20 within a groove of the ring 19.

Figure 5:
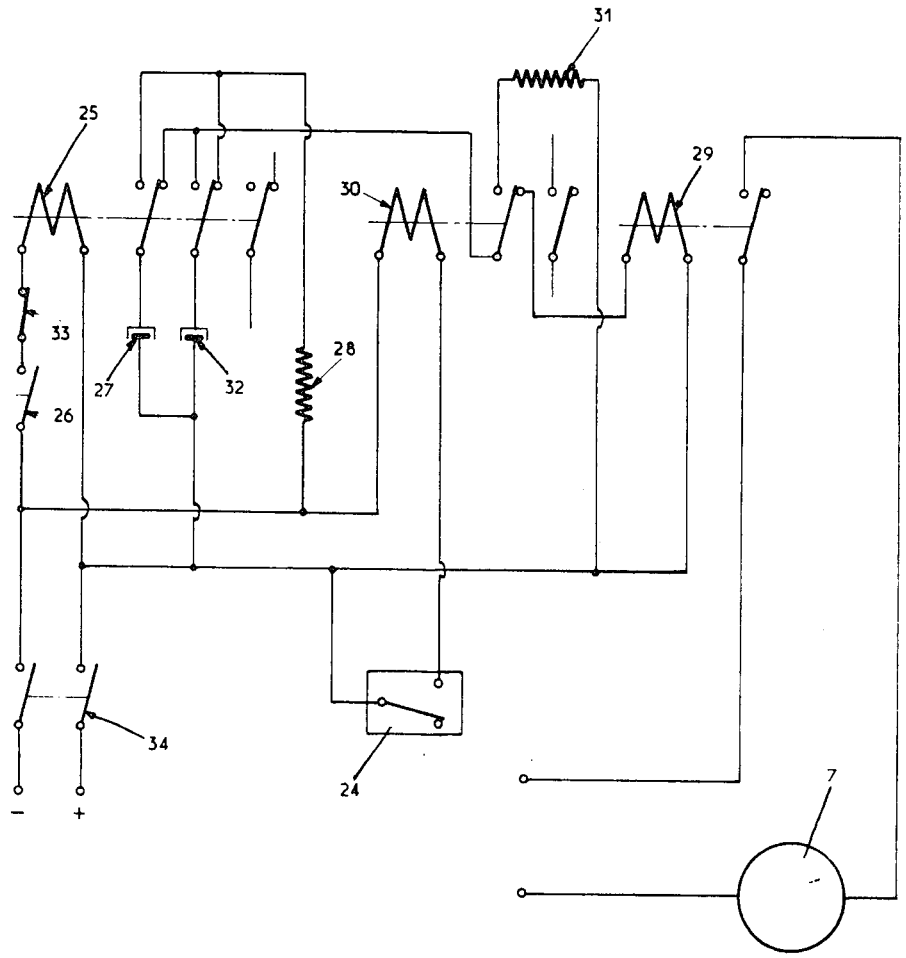
FIG. 5 is a diagram of the electrical control circuit.

Furthermore, except for the relay 25 which is controlled by the auxiliary contact 26 so that said relay 25 is closed at the same time as the contactor of the general controls of the forming machine, the different components of the electric control system are in the position shown in FIG. 5.

It will now be assumed, for example, that the machine which was initially in service stops producing cigarettes.

As soon as the main motor is caused to stop, the contact 26 opens the relay 25 which is supplied with current through the general contacts 34. The capacitor 27 which has previously been charged through the resistor 28 discharges into the coil of relay 29 which changes over to the operating position, thereby permitting the excitation of the clutch unit 7. The worm 8 effects the drive in the direction $f_2$ of the gearwheel 12, the grooved ring 14, the sleeve 15 and the inner cage of the block 16. The locking-bolt 20 locks the outer cage of the flexible block 16 in position by means of the members 19 and 2 and said block is thus subjected to torsion.

During this torsion, the force which is exerted by the ring 19 on the lower end of the locking-bolt 20 produces a torque which tends to cause this latter to pivot on its pin 21 in order that it should escape from the groove of the ring 19. However, this releasing action can take place only when a groove of the ring 14 reaches the level of the upper end of the locking-bolt 20.

At this moment, the angle of torsion of the block 16 attains the preselected value, the bolt penetrates into the groove 14b of the ring 14 and thus locks said ring in position while releasing the outer ring 19. The block 16 is suddenly released and rapidly drives in the direction of the arrow $f_2$ the drum which carries the blades 3.

During this movement, the microswitch 24 initiates the closure of the relay 30, one reversing pole of which opens the circuit of the relay 29 and rapidly completes the discharge of the capacitor 27 through the low-value resistor 31. The opening of relay 29 interrupts the excitation of the clutch unit 7.

When the block 16 is in the released condition, the grooves of the rings 14 and 19 again correspond and the locking-bolt 20 is permitted to fall back into the groove 19b of the ring 19 under the action of the spring of the microswitch 24.

The assembly of components which are coupled to the drum has rotated by one step in the direction $f_2$, thereby bringing a blade 3 into the rod-deflecting position.

Assuming now that the forming machine is put back into service, it will accordingly be noted that the capacitor 32 which has previously been charged through the resistor 28 is caused to discharge into the coil of relay 29 as soon as the relay 25 closes, and that the different electromechanical control operations are performed as indicated earlier. The drum again performs one rotational step in the direction of the arrow $f_2$ in order to break the rod of tobacco and to permit the introduction of the rod into the guides of the cutting unit.

The switch 33 serves to control the breaking device without stopping the general controls of the forming machine. In fact, the opening of the switch 33 during operation of the machine interrupts the supply of current to the relay 25; the capacitor 27 discharges into the coil of the clutch relay 29, the drum 2 rotates by one step and a blade 3 comes into the rod-deflecting position. The formed rod is then directed towards the wastebox.

In order to resume manufacture, it is merely necessary to close the switch 33, whereupon the relay 25 changes over to the operating position, the capacitor 32 discharges into the coil of the clutch unit 29 and the drum again rotates by one step. The rod of tobacco can then penetrate into the cutting section and cigarettes can be produced by the machine in the normal manner.

The possibility of control which has just been described offers an advantage in that the rod-breaker can be employed for the purpose of taking samples of tobacco as the formed cigarettes are delivered from the machine.

What is claimed is

1. A device for diverting and cutting a tobacco rod issuing from a continuous rod-making machine and traveling lengthwise in a substantially linear path across a gap to a rod-receiving member when said machine is operating correctly, said device comprising a movable deflector element mounted for movement between an operative and an inoperative position and which, in its inoperative position, is aside the path of the continuous rod, and in the operative position, is athwart said path to intercept and deflect the continuous rod, and means for transversely severing the continuous rod adapted to sever said rod when said deflector element is moving from its inoperative position to its operative position.

2. A device according to claim 1, further comprising means mounted upstream of said deflector element and adapted to sever said rod when deflected by said deflector element.

3. A device according to claim 2 wherein said deflector mechanism is a unitary member and said means for severing the continuous rod when deflector element is moving from its inoperative position to its operative position and said means mounted upstream of said deflector element are parts of said unitary member.

4. A device for diverting and cutting a rod issuing from a tobacco continuous rod-making machine and traveling lengthwise in a substantially linear path across a gap to a rod-receiving member when said machine is operating correctly, said device comprising means having a first part for diverting said rod from said linear path, and a second part for transversely cutting said rod in the diverted position and a third part transversely cutting said rod in the nondiverted position.

5. A device for diverting and cutting a rod issuing from a continuous rod-making machine and traveling lengthwise in a substantially linear path across a gap to a rod-receiving member when said machine is operating correctly, said device comprising one single member having a first part for diverting said rod from said linear path, a second part for cutting said rod in the diverted position and a third part cutting said rod in the nondiverted position.

6. A device according to claim 5, wherein said first part is arranged between said second part and said third part.

7. A device according to claim 6, wherein said member is rotatably mounted on an axis substantially parallel with said linear path, said member being rotatably arranged on said axis, and wherein said member comprises at least one deflecting piece having a front cutting edge and a rear cutting edge, said deflecting piece crossing said path of said rod when said member is rotated around said axis.

8. A device according to claim 7, wherein said member constitutes a drum, said drum carrying a plurality of blades on the periphery thereof, said blades having front and rear cutting edges.

9. A device according to claim 8, wherein said drum comprises an inner ring having external grooves thereon, a driving unit rotatably driving said inner ring, an outer ring having as many internal grooves thereon as said inner ring has external grooves, said outer ring being concentrically arranged with respect to said inner ring, said outer ring carrying said blades, an elastic means pivotally coupling said outer ring with said inner ring, and a pivoting locking-bolt engaging one of said grooves of said outer ring, said locking-bolt adapted to pivot and to be released upon said inner ring having rotated through an angle corresponding to the distance between two adjacent grooves on said inner ring.

10. A device according to claim 9, wherein said driving unit comprises an electromagnetic clutch connected with said control means of said machine.

11. A device according to claim 9, wherein said pivoting locking-bolt comprises first means for engaging said grooves of said inner ring, and second means for stopping said inner ring upon said first means engaging one of said grooves of said inner ring.

12. A device according to claim 11, and comprising third means for detecting said engagement and fourth means controlled by said third means for interrupting the electric circuit of said driving unit of said inner ring.

13. A device according to claim 12, wherein said third means comprises a microswitch and a capacitor, said microswitch controlling said capacitor.

* * * * *